United States Patent [19]
Ortiz

[11] 3,867,782
[45] Feb. 25, 1975

[54] CRAB TRAP

[76] Inventor: Nilson V. Ortiz, 1064 S. Vanness Ave. Apt. 4, San Francisco, Calif. 94110

[22] Filed: Feb. 19, 1974

[21] Appl. No.: 443,897

[52] U.S. Cl. .................................................. 43/105
[51] Int. Cl. ............................................. A01k 69/10
[58] Field of Search ...................... 43/100, 102, 105

[56] References Cited
UNITED STATES PATENTS

| | | | |
|---|---|---|---|
| 1,383,992 | 7/1921 | Masek | 43/105 |
| 1,887,059 | 11/1932 | Kraus et al. | 43/105 |
| 2,584,643 | 2/1952 | Vanderclute | 43/105 |

*Primary Examiner*—Warner H. Camp
*Attorney, Agent, or Firm*—Robert K. Rhea

[57] ABSTRACT

A wire frame suppports a base panel and top panel in parallel spaced relation. An upwardly and inwardly inclined crab enclosure wall is secured to the upper surface of the base panel marginal edges. Side and end panels, hingedly secured to the respective sides and ends of the base panel, are normally biased outwardly and downwardly coplanar with the base. Flexible hoist strands, secured to the respective side and end panels, are entrained through the central portion of the top panel for pivoting the side and end panels to a frame closed position and lifting the trap.

2 Claims, 4 Drawing Figures

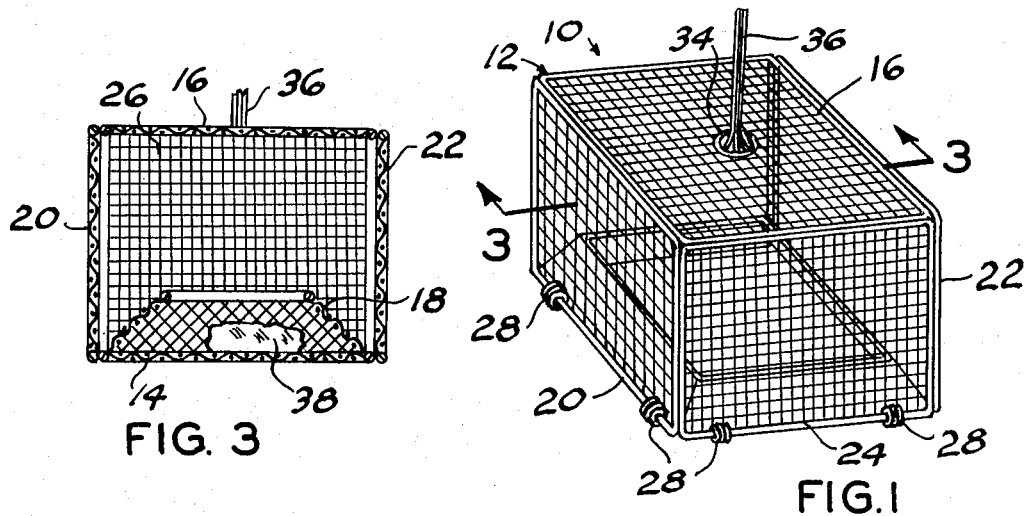
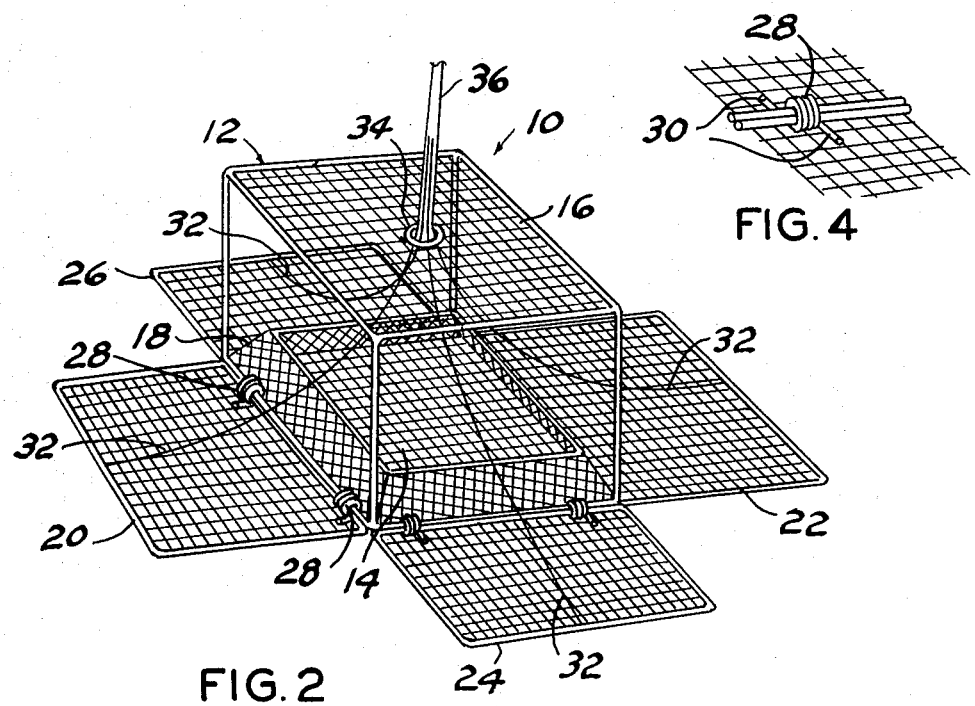

CRAB TRAP

BACKGROUND OF THE INVENTION

1. Field of the Invention.

The present invention relates to crab traps.

2. Description of the Prior Art.

Crab traps are generally constructed in two forms, noncollapsible and collapsible. The noncollapsible type, commonly called crab pots, are usually bulky, inconvenient to store and being of rigid construction have an opening through which a crab may enter in an effort to obtain bait placed in the pot with the opening arranged so that the crab cannot escape. Due to the bulk and the weight of such crab pots they are difficult to handle and frequently become damaged and require repair. The collapsible type traps, such as disclosed by U.S. Pat. Nos. 3,427,742 and 3,678,612, have the advantage of occupying a relatively small storage space when not in use but have the difficulty of their collapsible portions becoming bent and thus failing to function properly in closing or opening when submerged.

The present invention overcomes the above objections by being formed of lightweight material wherein the side and end panels of the trap are arranged in a simple hinge fashion which are automatically opened and are easily closed when submerged.

SUMMARY OF THE INVENTION

A substantially rectangular wire-like frame is provided with open wire mesh forming a base panel and a top panel in parallel spaced relation. An endless relatively short inwardly and upwardly inclined wire mesh wall is secured to the marginal edge portions of the base panel to form a crab retaining wall or enclosure. Side and end wire mesh panels are hingedly secured by one marginal edge to the respective side and end edges of the base panel by coil spring hinges normally urging the side and end panels outwardly and downwardly coplanar with the base panel. A flexible control strand is connected to the respective side and end panels at its marginal edge opposite its hinged connection and entrained through a guide ring in the top panel for releasing and closing the side and end panels and lifting or lowering the trap.

The principle object of this invention is to provide a lightweight wire mesh type crab trap having side and end walls biased to a trap open position when submerged and the hoisting line is released.

BRIEF DESCRIPTION OF THE DRAWINGS

FIG. 1 is a perspective view of the trap in closed hoisting line supported position;

FIG. 2 is a perspective view similar to FIG. 1 illustrating the trap when submerged and the hoisting line is released;

FIG. 3 is a vertical cross sectional view taken substantially along the line 3—3 of FIG. 1; and, FIG. 4 is a fragmentary perspective view, to a larger scale, illustrating the coil spring hinged connection of one of the side panels.

DESCRIPTION OF THE PREFERRED EMBODIMENT

Like characters of reference designate like parts in those figures of the drawings in which they occur.

In the drawings:

The trap comprises a right rectangular cage 10 having hingedly connected side and end panels. The cage is formed by an open wire-like frame 12 having defining sides and ends with wire mesh secured to its lower limit forming a base panel 14 and wire mesh similarly secured to its upper limit forms a top panel 16 in parallel spaced relation above the base panel 14. A relatively short endless inwardly and upwardly inclined length of wire mesh is secured to the marginal edge portions of the base panel 14 to form an inclined ramp 18 and a crab retaining wall or enclosure. A pair of wire mesh side panels 20 and 22 and a pair of end panels 24 and 26, each surrounded by a supporting wire dimensioned to close the respective side and end of the cage, are respectively hingedly connected to the base panel sur rounding portion of the frame. The hinge connection of the respective side and end panels, preferably comprises a coil spring 28 with the convolutions of the coil surrounding the respective side or end panel support wire and bottom rung of the frame so that the free end portions 30 of the coil springs bear, respectively, against the upper surface of the base panel 14 and inner surface of the wire mesh forming the side or end panel so that the coil spring normally tends to bias and pivot the respective side or end panel vertically outward about the axis of the hinged connection away from the cage toward a coplanar position with the base panel 14 when the trap is on a supporting surface.

An elongated flexible strand 32 is connected with the respective side and end panel at its marginal edge portion opposite its hinged connection and is entrained upwardly through the top panel of the cage through a guide ring 34 secured to the central portion of the top panel 16. The four strands 32 may in turn be secured at their other ends to a single lifting or hoisting line 36 for convenience.

OPERATION

In operation a quantity of bait 38 is placed within the enclosure on the upper surface of the base panel 14 and the cage 10 is lowered by the hoisting line 36 into a body of water, not shown, to a submerged supporting surface. Slack payed out in the supporting line permits the spring hinges 28 to pivot the respective side and end panels 20–22 and 24–26 outwardly substantially coplanar with the base panel 14. Crabs, not shown, then seeking the bait 38 climb the ramp wall 18 and once within the confines of the enclosure formed by the wall 18 are unable to escape. After a selected interval of time the hoisting line 36 is lifted pulling the flexible lines 32 upwardly through the guide ring 34 thus closing the cage while it is being lifted to the deck of a ship, or the like.

Obviously the invention is susceptible to changes or alterations without defeating its practicability, therefor, I do not wish to be confined to the preferred embodiment shown in the drawings and described herein.

I claim:

1. A crab trap, comprising:

a right rectangular open wire frame having a section of wire mesh secured to its bottom and top for forming a bottom panel and a top panel in vertically spaced relation;

an endless wall secured at its depending limit to the perimeter of said bottom panel and terminating at its upper limit intermediate the height of said frame for forming an enclosure within said frame, said endless wall being inclined inwardly and upwardly from said bottom panel for forming a ramp permitting entry of crabs to the enclosure;

side and end wall wire mesh panels hingedly connected respectively to the respective marginal side and end of said bottom panel; and, a flexible hoist strand connected, at one end, with each side and end panel, respectively, and extending at its other end portion through the central portion of said top panel.

2. The crab trap according to claim 1 and further including:

a coil spring forming the hinge connection between said bottom panel and the respective side and end panels for normally biasing said side and end panels toward a coplanar position with respect to said bottom panel.

* * * * *